United States Patent
Neumann et al.

(10) Patent No.: US 11,434,009 B2
(45) Date of Patent: Sep. 6, 2022

(54) SYSTEM FOR PROVIDING OXYGEN TO OXYGEN MASKS IN AN AIRCRAFT

(71) Applicant: Airbus Operations GmbH, Hamburg (DE)

(72) Inventors: Carsten Neumann, Hamburg (DE); Peter Kaul, Hamburg (DE); Patricia Kliem, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 938 days.

(21) Appl. No.: 16/218,220

(22) Filed: Dec. 12, 2018

(65) Prior Publication Data

US 2019/0185166 A1 Jun. 20, 2019

(30) Foreign Application Priority Data

Dec. 20, 2017 (DE) .......................... 102017130749.4

(51) Int. Cl.
*B64D 13/06* (2006.01)
*A62B 7/14* (2006.01)
*A62B 7/02* (2006.01)

(52) U.S. Cl.
CPC ............... *B64D 13/06* (2013.01); *A62B 7/14* (2013.01); *A62B 7/02* (2013.01); *B64D 2013/0681* (2013.01); *B64D 2231/02* (2013.01)

(58) Field of Classification Search
CPC ............ B64D 13/06; B64D 2013/0681; B64D 2231/02; A62B 7/14; A62B 7/02; A62B 18/02; Y02T 50/50; F16K 17/36
See application file for complete search history.

(56) References Cited

U.S. PATENT DOCUMENTS 2,353,906 A * 7/1944 Kirschbaum ............ A62B 7/14
128/204.29
2,552,595 A * 5/1951 Seeler .................... A62B 9/027
128/204.26
(Continued)

FOREIGN PATENT DOCUMENTS

DE 69007840 T2 11/1994
DE 102009037380 A1 2/2011
(Continued)

OTHER PUBLICATIONS

Chinese Office Action for corresponding Chinese Patent Application No. 2020092302275120 dated Sep. 27, 2020.
(Continued)

*Primary Examiner* — Victoria Murphy
(74) *Attorney, Agent, or Firm* — Greer, Burns & Crain, Ltd.

(57) ABSTRACT

Described herein are a system for providing oxygen to oxygen masks in an aircraft, and an associated method for regulating the oxygen flow in an efficient manner. The system has an oxygen tank, oxygen masks, first and second oxygen lines, and an electrically controllable valve. The valve is coupled to the oxygen tank and the two oxygen lines. The oxygen masks are coupled to the oxygen lines downstream of the valve to accommodate the transfer of oxygen from the oxygen tank via the valve. In a working state when an electrical signal is applied the valve produces a connection between the oxygen tank and the first oxygen line when required, and permanently prevents a connection between the oxygen tank and the second oxygen line. When in a rest state, the valve produces a permanent connection between the oxygen tank and the second oxygen line.

12 Claims, 2 Drawing Sheets

(56) References Cited

U.S. PATENT DOCUMENTS

| | | | | |
|---|---|---|---|---|
| 3,179,119 | A | * | 4/1965 | Fitt ................. A62B 9/022 137/81.1 |
| 3,675,649 | A | * | 7/1972 | Basham ............ H02K 33/18 128/204.22 |
| 3,830,257 | A | * | 8/1974 | Metivier ............ A61M 16/00 137/88 |
| 3,981,300 | A | * | 9/1976 | Williams ............. A62B 7/08 422/112 |
| 4,011,865 | A | * | 3/1977 | Morishita ......... A41D 13/1161 128/201.15 |
| 4,481,945 | A | * | 11/1984 | Levine ............. B64D 11/0632 128/202.13 |
| 5,036,842 | A | * | 8/1991 | van der Smissen . A62B 18/006 128/205.12 |
| 5,411,059 | A | | 5/1995 | Sever et al. |
| 9,089,721 | B1 | * | 7/2015 | Horstman .............. A62B 7/14 |
| 9,550,570 | B2 | * | 1/2017 | Kshirsagar ............ B64D 11/00 |
| 2005/0061915 | A1 | * | 3/2005 | Vogt ..................... B64D 13/00 244/118.5 |
| 2006/0019594 | A1 | * | 1/2006 | Horner ................. B64D 13/02 454/74 |
| 2006/0118115 | A1 | * | 6/2006 | Cannon ................. A62B 7/04 128/204.26 |
| 2007/0017573 | A1 | * | 1/2007 | Frampton ........... F16K 37/0091 137/81.1 |
| 2007/0144597 | A1 | * | 6/2007 | Cazenave ............ B64D 25/00 137/899.2 |
| 2008/0072907 | A1 | * | 3/2008 | Deane ................... A62B 7/14 128/204.26 |
| 2008/0090510 | A1 | * | 4/2008 | Scherer ................ B64D 37/32 454/71 |
| 2008/0173355 | A1 | * | 7/2008 | Meckes ................ B64D 10/00 137/109 |
| 2008/0202511 | A1 | * | 8/2008 | Meckes ................ B64D 10/00 96/108 |
| 2009/0189103 | A1 | * | 7/2009 | Siska, Jr ............ G05D 16/107 251/129.08 |
| 2010/0089397 | A1 | * | 4/2010 | Klockseth ........... A62B 18/006 128/205.12 |
| 2013/0312743 | A1 | * | 11/2013 | Kshirsagar ............. A62B 7/14 128/204.23 |
| 2013/0312744 | A1 | * | 11/2013 | Kshirsagar ............ B64D 13/02 128/204.23 |
| 2013/0312745 | A1 | * | 11/2013 | Kshirsagar ............. A62B 7/08 128/202.26 |
| 2014/0000590 | A1 | * | 1/2014 | Rittner ............... C01B 13/0296 128/202.26 |
| 2016/0325123 | A1 | * | 11/2016 | Elliott .................... A62B 7/14 |
| 2019/0152612 | A1 | * | 5/2019 | Leuenberger .......... B64D 13/06 |
| 2019/0185166 | A1 | * | 6/2019 | Neumann ............... A62B 7/14 |
| 2020/0215358 | A1 | * | 7/2020 | Degenhardt ............ A62B 7/04 |

FOREIGN PATENT DOCUMENTS

| | | |
|---|---|---|
| EP | 0499505 A1 | 8/1992 |
| WO | 2008138930 A2 | 11/2008 |

OTHER PUBLICATIONS

German Patent Office, German Search Report for Application No. 10 2017 130 749.4, dated Oct. 12, 2018.

* cited by examiner

SYSTEM FOR PROVIDING OXYGEN TO OXYGEN MASKS IN AN AIRCRAFT

CROSS-REFERENCE TO PRIORITY APPLICATION

This application claims the benefit of, and priority to, German patent application number DE 102017130749.4, filed Dec. 20, 2018. The content of the referenced application is incorporated by reference herein.

TECHNICAL FIELD

Embodiments of the subject matter described herein relate generally to a system for providing oxygen to oxygen masks in an aircraft, to an aircraft having a system of said type, and to a method for providing oxygen to oxygen masks in an aircraft.

BACKGROUND

The use of electrical systems in aircraft is ever-increasing in order to increase comfort, realize new functions and increase efficiency, and for other reasons. This may also relate to the replacement of purely mechanical, hydraulic or pneumatic systems with electrical systems. It may be important here for electrically operated systems to be activated and/or designed such that the total electrical current consumption of said systems does not exceed the electrical current available in particular operating states in the aircraft, or, in other operating states, non-essential systems are shut down or restricted in terms of their power.

In modern passenger aircraft, use is made, in some cases, of oxygen systems which discharge oxygen into the cabin in pulsed fashion in a manner dependent on ambient conditions. In this way, the consumption of oxygen can be regulated in an efficient manner, though this requires electronics units which control the pulsed discharge. The electrical current consumption of said electronics units must be taken into consideration in the design of the electrical current supply in particular operating states.

Patent publication WO 2008138930A2 describes an oxygen supply device in which a valve connected to a control unit can be switched between an oxygen source and a breathing mask or the like in order to perform a pulsed discharge of oxygen to the breathing mask. The entirety of such control units in an aircraft can lead to a high electrical current requirement.

BRIEF SUMMARY

It could be expedient to optimize the energy requirement for an oxygen system such that, in particular in an unlikely situation of a restricted electrical energy supply, an efficient oxygen supply can nevertheless be ensured. At the same time, however, the amount of oxygen to be carried on board should as far as possible not be increased, in order to be able to maintain a compact design of an oxygen system.

It is therefore an object of the present disclosure to provide an oxygen supply system which cannot only regulate the oxygen throughflow in an efficient manner but can also, in particular operating states with insufficient available electrical power, likewise provide a sufficient oxygen supply.

The object is achieved by means of the features of independent Claim 1. The dependent claims and the following description relate to advantageous embodiments and refinements.

According to a first aspect of the disclosure, a system for providing oxygen to oxygen masks in an aircraft is proposed. The system has an oxygen tank, one or more oxygen masks, a first oxygen line and a second oxygen line, and a first electrically controllable valve. The first valve is coupled to the oxygen tank, to the first oxygen line and to the second oxygen line. The oxygen masks are each coupled to the first oxygen line and the second oxygen line downstream of the first valve for the transfer of oxygen from the oxygen tank via the first valve. The first valve is designed to, in a working state, when an electrical signal is applied, produce a connection between the oxygen tank and the first oxygen line when required, and permanently prevent a connection between the oxygen tank and the second oxygen line, and in a rest state, in the absence of an electrical signal, produce a permanent connection between the oxygen tank and the second oxygen line.

The system may be realized in the form of a structural unit, which could for example be assigned to a seat group above which said structural unit is situated. Below, only the essential components of the system required for the understanding of the disclosure will be discussed. It is clear that a storage compartment for accommodating breathing masks, hoses and a closure flap, and a closure mechanism which opens the closure flap, may be provided in addition to the stated components.

The oxygen tank may be designed in the form of a pressurized oxygen tank or some other device which is suitable for discharging oxygen as required. The oxygen tank may constitute a component of the abovementioned structural unit.

The transfer of oxygen from the oxygen source to the breathing mask may be realized via two different paths. In a working state, which will be described further below, oxygen can be conducted from the oxygen source via the first oxygen line to the breathing masks. By contrast, in a rest state, oxygen is conducted to the breathing masks exclusively via the second oxygen line. The working state of the first valve may also be referred to as electrical-current-operated state. This working state consequently corresponds to a conventional operating mode, in which there is no restriction on the electrical current supply. The rest state of the first valve may also be referred to as electrically currentless state, or as initial position. The rest state is assumed in the absence of sufficient electrical power for the conventional operation of the system.

The first valve can, in the working state, be opened and closed as required for the supply of oxygen to the oxygen masks. The opening and closing may be performed for example by means of a control unit. The control unit and the first valve are set into this conventional operating state by the electrical signal, for example an applied direct-current voltage. In this way, the first required oxygen quantity can be conducted to the oxygen masks in pulsed bursts by opening and closing of the first valve. An efficient discharge of oxygen can be carried out in this way. Aside from the pulsed bursts, a continuous flow of oxygen is however also conceivable, which can be correspondingly influenced by a control unit of said type.

The first valve can be set into the rest state in the electrically currentless state. For this purpose, the first valve may be designed to be forced into the rest state at all times by a continuously acting restoring force. Only by means of electrical power, which is supplied for example to an electromagnet or the like, can the first valve be set into the operating state or forced out of the rest state. The first valve may consequently have at least three positions. In a first position, the through flow through the valve is shut off entirely. In a second position, a permanent connection to the second oxygen line may be performed. In the third position, a connection to the first oxygen line may be realized.

The oxygen masks may be arranged in the aircraft in the vicinity of a passenger, preferably in a region above a passenger seat. After centrally triggered automatic opening of a flap which holds the oxygen masks in a corresponding container, which oxygen masks then fall down when the opening occurs, the passenger can grip an oxygen mask. The passenger can then place the oxygen mask over their mouth and nose in order to inhale oxygen.

When the system has been activated, that is to say it is in a state in which oxygen is discharged, oxygen can flow from the oxygen tank to the respective oxygen mask. Assuming that the working state is present, a connection can be produced as required between the oxygen tank and the first oxygen line. As presented above, a control unit or the like can allow oxygen to flow through the first oxygen line as required, for example in pulsed fashion. This follows downstream of the first valve, and oxygen consequently flows to the oxygen mask gripped by a passenger. Here, the expression "downstream" is to be understood as an oxygen flow direction directed from the oxygen tank to the respective oxygen mask.

The oxygen lines are designed to conduct the oxygen from the oxygen tank to the oxygen masks. The oxygen is transported in gaseous form. The system has the advantage that the supply of oxygen to the oxygen masks is performed with normal function in the electrical-current-operated state, and a sufficient emergency oxygen supply is ensured in the electrically currentless state.

In one embodiment, the first valve has a solenoid valve, and in the working state is activatable such that pulsed bursts of oxygen can be transferred to the oxygen masks. In this way, the oxygen conducted to the oxygen masks is regulated to the required oxygen quantity by virtue of successive pulses being performed. The length of the pulses and/or the intervals between the pulses can be adjusted in order to discharge a predefinable average oxygen quantity over a certain time period. It is thus possible for oxygen to be saved overall.

In one embodiment, a control unit calculates a required oxygen quantity for the pulsed bursts of oxygen in a manner dependent on a present cabin altitude of the aircraft and a present air temperature in the aircraft, and activates the first valve in a working state on the basis of the calculated required oxygen quantity. The control unit opens and closes the first valve in the working state with a varying duration or an adjustable clock cycle in a manner dependent on the required oxygen quantity. By means of this quantity of the oxygen supply adapted on the basis of the cabin altitude and temperature, a desired oxygen saturation for the passengers is maintained. The quantity of oxygen required to ensure the oxygen saturation or to attain a sufficient oxygen partial pressure is dependent on the cabin altitude. The control unit should consequently be capable of detecting the cabin altitude, for example by means of a dedicated absolute pressure sensor or using corresponding information from a superordinate device within the aircraft in which the system is integrated. Electrical current is required for this purpose, because a solenoid valve opens and closes the oxygen path. The solenoid valve is designed such that it regulates the oxygen flow in the working state by opening and closing, and in an electrically currentless state, adjusts such that the oxygen is conducted into the second oxygen line.

Here, the cabin altitude refers to an altitude present outside the aircraft with an atmospheric pressure which corresponds to the cabin interior pressure in the aircraft. For example, the control unit may activate the first valve such that, during descending flight, the supplied oxygen quantity is adapted to a descending cabin altitude by virtue of the pulses or the intervening intervals being correspondingly adapted.

In one embodiment, a duration of the pulsed bursts of oxygen can be varied by means of the duration of the opened first valve in the working state. For example, in the case of a relatively high demand for oxygen, the first valve may be open for longer periods and closed for shorter periods within a clock cycle.

In a further advantageous embodiment, the system furthermore has a second valve, which is arranged on the second oxygen line. In the event of an interruption of the electrical current supply, the oxygen supply in the working state is interrupted. This may relate to a state in which a provided electrical power is not sufficient to be able to operate all of the electrical systems on board. The electrical current supply may also be intentionally interrupted. In the system according to the disclosure, the oxygen supply can however be realized by means of the rest state of the first valve and the utilization of the second valve. Through the shutdown of the control units of the oxygen supply in the working state, the electrical current consumption is reduced.

In a further advantageous embodiment, the second valve transfers a second required oxygen quantity to the oxygen masks in a manner dependent on the cabin altitude of the aircraft. The second valve is designed to provide an altitude-compensated oxygen quantity even in the absence of a supply of electrical energy. This has the advantage that an altitude-compensated oxygen supply is ensured even in the electrically currentless state. One possible embodiment of a second valve of said type will be discussed further below.

In a further advantageous embodiment, the second valve has an aperture. The aperture is designed to adapt the required oxygen quantity conducted through the second oxygen line to the cabin altitude. In one example, the aperture is arranged in the interior of the second oxygen line in order to locally vary the size of a throughflow opening as required in order to intentionally adjust a flow resistance in order to influence the flow speed and thus the volume flow. In this way, the required oxygen quantity can be adapted by means of an adjustment of the aperture in, on or fluidically connected to the second oxygen line.

In a further advantageous embodiment, the second valve is an aneroid valve. An aneroid valve is a valve controlled by means of an aneroid capsule. An aneroid capsule is to be understood as a capsule element. In a manner dependent on the absolute pressure, that is to say in this case on the cabin altitude, the capsule element is either compressed or relieved of load. The capsule element consequently controls the second valve such that the diameter of the oxygen flow of the second line is adapted in a manner dependent on the cabin altitude. In this way, the oxygen supply system can supply an altitude-compensated oxygen quantity to the oxygen masks even in the electrically currentless state.

In a further advantageous embodiment, the system furthermore has a third valve, wherein the third valve is arranged on the second oxygen line downstream of the second valve. The third valve is designed to open in the presence of a negative pressure in order to conduct oxygen into the oxygen mask. A negative pressure of said type may arise when breathing is performed with an oxygen mask fitted. In this way, the third valve is opened as required, such that oxygen is conducted through the second oxygen line into the oxygen mask. The third valve is correspondingly closed when the person is not presently breathing in with the mask fitted, or is breathing out. In this way, the oxygen can be conducted onward to the passenger as required. In this way, it is possible for only the required oxygen quantity to be conducted onward, and for oxygen to be saved.

According to a second aspect of the disclosure, a method for the supply of oxygen to oxygen masks is proposed. The method has the following steps: A connection between the oxygen tank and the first oxygen line is produced by means of a first, electrically controllable valve in a working state when an electrical signal is applied. The first valve is set into a rest state when the electrical signal is not applied in order to produce a permanent connection between the oxygen tank and the second oxygen line, such that oxygen is conducted via a second valve to the oxygen masks.

In one advantageous embodiment, the method has a following further step. The first valve is activated such that, in the working state, pulsed bursts of oxygen are transferred from the first valve to the oxygen masks.

Finally, the disclosure relates to an aircraft having a passenger cabin and multiple systems arranged therein in accordance with the above description.

It is pointed out that the features of the exemplary embodiments of the system also apply to embodiments of the cabin segment and of the aircraft, and vice versa. Furthermore, it is also possible to freely combine with one another those features for which this is not explicitly mentioned.

These and further aspects of the disclosure will become clear with reference to the following statements.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses of the present disclosure will emerge from the following description of the exemplary embodiments and from the figures. Here, all of the features described and/or illustrated in the figures form the subject matter of the disclosure individually and in any desired combination, even independently of the combination of said features in the individual claims or the back-references thereof. Furthermore, in the figures, the same reference designations are used for identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
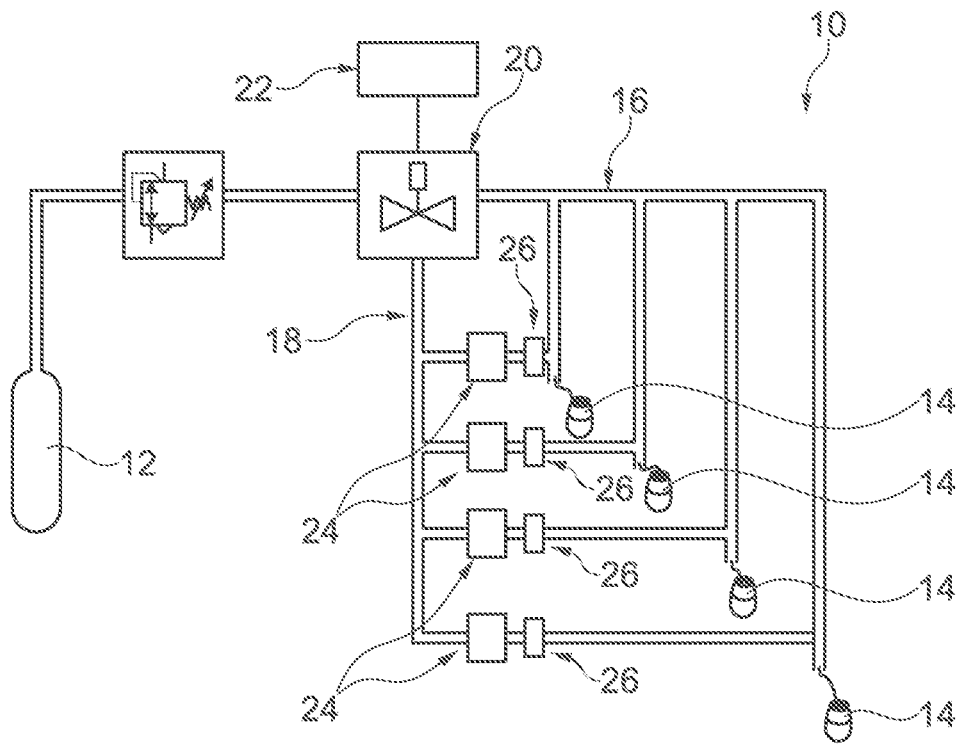
FIG. 1 shows a schematic illustration of the system for providing oxygen to oxygen masks in an aircraft.

FIG. 1 shows a system 10 for providing oxygen to oxygen masks in an aircraft. The system has an oxygen tank 12, one or more oxygen masks 14, a first oxygen line 16 and a second oxygen line 18, and a first electrically controllable valve 20. The first valve 20 is coupled to the oxygen tank 12, to the first oxygen line 16 and to the second oxygen line 18. The oxygen masks 14 are each coupled to the first oxygen line 16 and the second oxygen line 18 downstream of the first valve 20 for the transfer of oxygen from the oxygen tank 12 via the first electrically controllable valve 20. The first valve 20 is designed to, in a working state, when an electrical signal is applied, produce a connection between the oxygen tank 12 and the first oxygen line 16 when required, and permanently prevent a connection between the oxygen tank 12 and the second oxygen line 18, and, in a rest state, produce a permanent connection between the oxygen tank 12 and the second oxygen line 18.

The first valve 20 preferably has a solenoid valve, and in the working state is activatable such that pulsed bursts of oxygen can be conducted to the oxygen masks 14. The bursts of oxygen or pulses may be performed in a particular clock cycle in which the open positions and closed positions of the first valve 20 alternate. The clock cycle can be influenced as desired such that the duration of an open position and the duration of a closed position are adapted.

In one example, the control unit 22 calculates a required oxygen quantity for the pulsed bursts of oxygen in a manner dependent on a present cabin altitude of the aircraft and a present air temperature in the aircraft, and activates the first valve 20 in a working state on the basis of the calculated required oxygen quantity. The control unit 22 opens and closes the first valve 20 in the working state with a varying duration in a manner dependent on the required oxygen quantity. Here, a duration of the pulsed bursts of oxygen can be varied by means of the duration of the opened first valve 20 in the working state.

Figure 2:
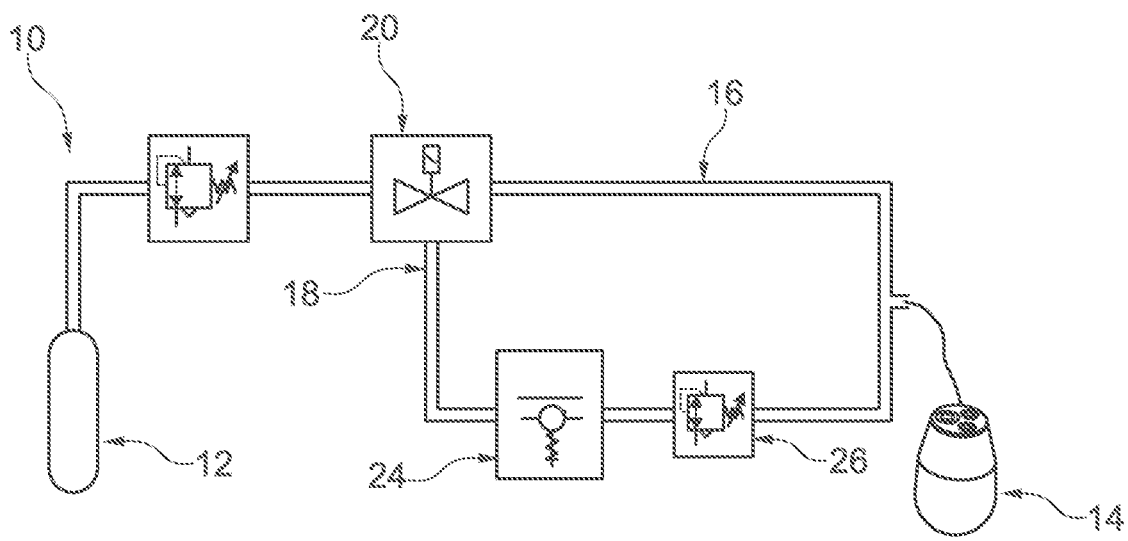
FIG. 2 shows a further schematic illustration of the system according to an embodiment of the invention.

As shown in FIG. 1 in FIG. 2, the system 10 furthermore has a second valve 24, which is arranged on the second oxygen line 18. If the first valve 20 moves into its initial position when no electrical current is applied, the oxygen prevails in the second oxygen line 18 at a second valve 24 or, as shown here, at multiple second valves 24.

In one example, the second valve 24 transfers a second required oxygen quantity to the oxygen masks 14 in a manner dependent on the cabin altitude of the aircraft. The second valve 24 may, by way of example, regulate the required oxygen quantity by virtue of the second valve 24 adapting a throughflow opening on the second control line 18 in a manner dependent on the second required oxygen quantity, such that regulation of the volume flow is performed.

The second valve is preferably an aneroid valve. This has a compressible hollow body, which can also be referred to as capsule element and is compressed or expanded in a manner dependent on the pressure surrounding it. The capsule element is arranged in the second valve such that a throughflow opening is directly influenced by the state of expansion of the capsule element. The capsule element is consequently, owing to its size which is dependent on the cabin altitude, capable of directly adapting the volume flow that can be realized through the second oxygen line. In this way, the oxygen supply system can supply an altitude-compensated quantity of oxygen to the oxygen masks even in the electrically currentless state.

As shown in FIG. 1 and FIG. 2, the system preferably has a third valve 26, wherein the third valve 26 is arranged on the second oxygen line 18 downstream of the second valve 24. The third valve 26 is designed so as to open in the presence of a particular differential pressure. By means of this pressure sensitivity, said third valve can detect when a person is breathing in via a fitted oxygen mask, and then opens in order to conduct oxygen into the oxygen mask 14. In the absence of the negative pressure caused by breathing in, the third valve 26 closes again.

The proposed system ensures the saving of oxygen even in an electrically currentless state. The system thus has an advantage in relation to other known concepts, which either deliver oxygen in a continuous flow and thus have a tendency to deliver too much oxygen, or consume too much electrical current.

Figure 3:
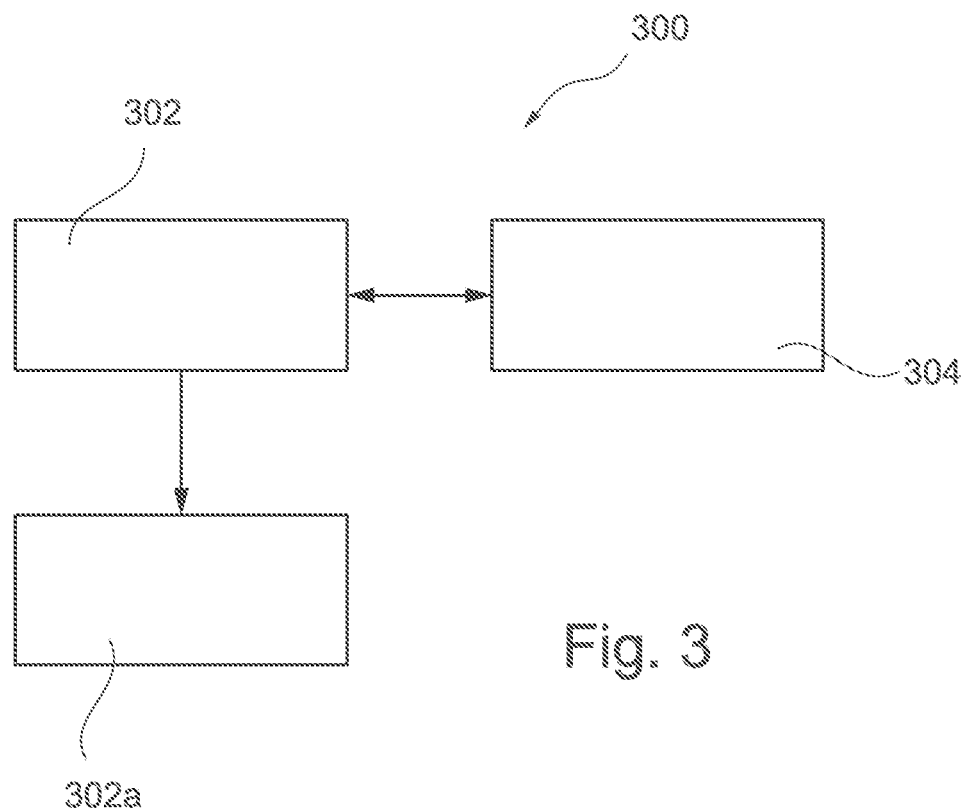
FIG. 3 shows a method for providing oxygen to oxygen masks in an aircraft.

FIG. 3 shows a method 300 for the supply of oxygen to oxygen masks. The method comprises the following steps: In a step 302, a connection between the oxygen tank and the first oxygen line is produced by means of a first, electrically controllable valve in a working state when an electrical signal is applied. In another step 304, the first valve is set into a rest state when the electrical signal is not applied in order to produce a permanent connection between the oxygen tank and the second oxygen line. Oxygen is thus conducted via a second valve to the oxygen masks.

By means of the method 300, an altitude-compensated oxygen supply in the working state can be made possible, but a conventional oxygen supply is made possible in a rest state without electrical energy. In a working state, an oxygen supply is provided in an efficient manner by means of a throughflow-controlled valve.

In step 302, the first valve is switched into a working position. After loss of electrical power, the first valve is set into the initial position (step 304), and the oxygen is diverted via the second oxygen line 18. In the initial position, oxygen can pass through an altitude-compensating aneroid valve, which regulates the oxygen quantity. In a further step (not shown), a downstream third valve can open the oxygen supply for the time in which breathing in is performed at the oxygen mask 14. The third valve is for example a demand pressure regulator. The demand pressure regulator keeps the oxygen path closed when the passenger is not breathing in, and opens said oxygen path as soon as a negative pressure prevails at the oxygen mask 14 during breathing-in.

In one example, the method has a further step 302a, in which the first valve 20 is activated such that pulsed bursts of oxygen are transferred to the oxygen masks 14 by the first valve 20 in the working state.

The above-described exemplary embodiments may be combined in a variety of ways.

Figure 4:
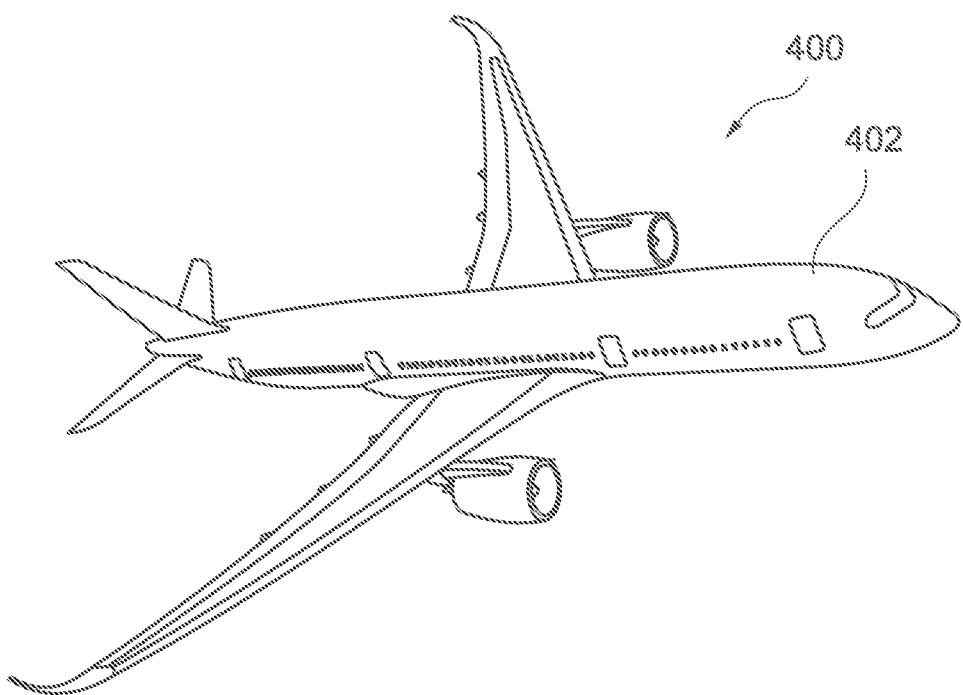
FIG. 4 shows an aircraft having a passenger cabin in which at least one system according to the disclosure is provided.

Finally, FIG. 4 shows an aircraft 400 with a passenger cabin 402 and with a system 10 as per the above description arranged therein.

It is additionally pointed out that "comprising" does not rule out other elements or steps, and "a" or "an" do not rule out a multiplicity. It is also pointed out that features that have been described with reference to one of the above exemplary embodiments may also be used in combination with other features or steps of other exemplary embodiments described above. Reference signs in the claims are not to be regarded as limiting.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for providing oxygen to one or more oxygen masks in an aircraft, the system comprising:
   an oxygen tank;
   the one or more oxygen masks;
   a first oxygen line and a second oxygen line; and
   a first electrically controllable valve;
   wherein the first electrically controllable valve is coupled to the oxygen tank, to the first oxygen line, and to the second oxygen line;
   wherein the one or more oxygen masks are each coupled to the first oxygen line and the second oxygen line downstream of the first electrically controllable valve for the transfer of oxygen from the oxygen tank via the first electrically controllable valve;
   wherein, in a working state when an electrical signal is applied, the first electrically controllable valve produces a connection between the oxygen tank and the first oxygen line when required, and permanently prevents a connection between the oxygen tank and the second oxygen line;
   wherein, in a rest state in an absence of the electrical signal, the first electrically controllable valve produces a permanent connection between the oxygen tank and the second oxygen line; and
   wherein the first electrically controllable valve has a solenoid valve, and in the working state is activatable such that the first electrically controllable valve is configured to be opened and closed to transfer pulsed bursts of oxygen to the one or more oxygen masks.

2. The system according to claim 1, wherein:
   a control unit calculates a first required oxygen quantity for the pulsed bursts of oxygen in a manner dependent on a present cabin altitude of the aircraft and a present air temperature in the aircraft, and activates the first electrically controllable valve in a working state based on the calculated first required oxygen quantity; and
   the control unit opens and closes the first electronically controllable valve in the working state with a varying duration in a manner dependent on the first required oxygen quantity.

3. The system according to claim 1, wherein a duration of the pulsed bursts of oxygen can be varied by means of a duration of the opened first electronically controllable valve in the working state.

4. The system according to claim 1, further comprising a second valve arranged on the second oxygen line.

5. The system according to claim 4, wherein the second valve transfers a second required oxygen quantity to the one or more oxygen masks in a manner dependent on a cabin altitude of the aircraft.

6. The system according to claim 4, wherein the second valve has an aperture configured to adapt the second required oxygen quantity conducted through the second oxygen line according to an altitude of a cabin of the aircraft.

7. The system according to claim 4, wherein the second valve is an aneroid valve.

8. The system according to claim 4, further comprising a third valve arranged on the second oxygen line downstream of the second valve, the third valve configured to open in the presence of a negative pressure in order to conduct oxygen into the one or more oxygen masks.

9. A method of supplying oxygen to one or more oxygen masks in a system for providing the oxygen to the one or more oxygen masks in an aircraft, the system comprising:
an oxygen tank;
the one or more oxygen masks;
a first oxygen line and a second oxygen line; and
a first electrically controllable valve;
wherein the first electrically controllable valve is coupled to the oxygen tank, to the first oxygen line, and to the second oxygen line;
wherein the one or more oxygen masks are each coupled to the first oxygen line and the second oxygen line downstream of the first electrically controllable valve for the transfer of oxygen from the oxygen tank via the first electrically controllable valve;
wherein, in a working state when an electrical signal is applied, the first electrically controllable valve produces a connection between the oxygen tank and the first oxygen line when required, and permanently prevents a connection between the oxygen tank and the second oxygen line;
wherein, in a rest state in an absence of the electrical signal, the first electrically controllable valve produces a permanent connection between the oxygen tank and the second oxygen line; and
wherein the first electrically controllable valve has a solenoid valve, and in the working state is activatable such that the first electrically controllable valve is configured to be opened and closed to transfer pulsed bursts of oxygen to the one or more oxygen masks, the method comprising the steps of:
producing the connection between the oxygen tank and the first oxygen line using the first electrically controllable valve in the working state when the electrical signal is applied;
setting the first electronically controlled valve into the rest state when the electrical signal is not applied, to produce the permanent connection between the oxygen tank and the second oxygen line, and to conduct oxygen via a second valve to the one or more oxygen masks; and
activating the first electronically controlled valve such that the pulsed bursts of oxygen are transferred to the one or more oxygen masks by the first electronically controlled valve in the working state.

10. An aircraft comprising:
a passenger cabin; and
a system for providing oxygen to one or more oxygen masks in the passenger cabin, the system comprising:
an oxygen tank;
the one or more oxygen masks;
a first oxygen line and a second oxygen line; and
a first electrically controllable valve;
wherein the first electronically controlled valve is coupled to the oxygen tank, to the first oxygen line, and to the second oxygen line;
wherein the one or more oxygen masks are each coupled to the first oxygen line and the second oxygen line downstream of the first electronically controlled valve for the transfer of oxygen from the oxygen tank via the first electronically controlled valve;
wherein, in a working state when an electrical signal is applied, the first electronically controlled valve produces a connection between the oxygen tank and the first oxygen line when required, and permanently prevents a connection between the oxygen tank and the second oxygen line;
wherein, in a rest state in the absence of the electrical signal, the first electronically controlled valve produces a permanent connection between the oxygen tank and the second oxygen line; and
wherein the first electronically controlled valve has a solenoid valve, and in the working state is activatable such that the first electronically controlled valve is configured to be opened and closed to transfer pulsed bursts of oxygen to the one or more oxygen masks.

11. A system for providing oxygen to one or more oxygen masks in an aircraft, the system comprising:
an oxygen tank;
the one or more oxygen masks;
a first oxygen line and a second oxygen line; and
a first electrically controllable valve;
wherein the first electrically controllable valve is coupled to the oxygen tank, to the first oxygen line, and to the second oxygen line;
wherein the one or more oxygen masks are each coupled to the first oxygen line and the second oxygen line downstream of the first electrically controllable valve for the transfer of oxygen from the oxygen tank via the first electrically controllable valve;
wherein, in a working state when an electrical signal is applied, the first electrically controllable valve produces a connection between the oxygen tank and the first oxygen line when required, and permanently prevents a connection between the oxygen tank and the second oxygen line;
wherein, in a rest state in an absence of the electrical signal, the first electrically controllable valve produces a permanent connection between the oxygen tank and the second oxygen line;
wherein a control unit calculates a first required oxygen quantity for pulsed bursts of oxygen in a manner dependent on a present cabin altitude of the aircraft and a present air temperature in the aircraft, and activates the first electronically controlled valve in the working state based on the calculated first required oxygen quantity; and
wherein the control unit opens and closes the first electronically controlled valve in the working state with a varying duration in a manner dependent on the first required oxygen quantity.

12. The system according to claim 11, wherein a duration of the pulsed bursts of oxygen can be varied by means of a duration of the opened first electronically controlled valve in the working state.

* * * * *